(12) United States Patent
Yang

(10) Patent No.: US 11,841,596 B2
(45) Date of Patent: Dec. 12, 2023

(54) ARRAY SUBSTRATE, DISPLAY PANEL AND DISPLAY DEVICE

(71) Applicant: HKC CORPORATION LIMITED, Shenzhen (CN)

(72) Inventor: Yanna Yang, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/075,608

(22) Filed: Dec. 6, 2022

(65) Prior Publication Data
US 2023/0288765 A1    Sep. 14, 2023

(30) Foreign Application Priority Data

Mar. 14, 2022   (CN) .......................... 202210246303.6

(51) Int. Cl.
*G02F 1/1343*  (2006.01)
*G02F 1/1362*  (2006.01)
*G02F 1/1368*  (2006.01)

(52) U.S. Cl.
CPC ...... *G02F 1/136286* (2013.01); *G02F 1/1368* (2013.01); *G02F 1/136213* (2013.01); *G02F 1/136222* (2021.01)

(58) Field of Classification Search
CPC .................................................... G02F 1/1362
See application file for complete search history.

(56) References Cited

U.S. PATENT DOCUMENTS

| 6,040,882 | A | * | 3/2000 | Jun | ................... | G02F 1/136213 |
|---|---|---|---|---|---|---|
| | | | | | | 349/111 |
| 2010/0157230 | A1 | * | 6/2010 | Cho | ................... | G02F 1/136286 |
| | | | | | | 349/187 |
| 2016/0189645 | A1 | * | 6/2016 | Lee | ................... | G02F 1/133377 |
| | | | | | | 345/206 |
| 2018/0188614 | A1 | * | 7/2018 | Yeh | ....................... | G02F 1/1368 |
| 2021/0397054 | A1 | * | 12/2021 | Zhong | ............... | G02F 1/133603 |
| 2022/0102382 | A1 | * | 3/2022 | Lin | ................... | G02F 1/136286 |

FOREIGN PATENT DOCUMENTS

| CN | 101241287 | A | 8/2008 | |
|---|---|---|---|---|
| CN | 101770126 | A | 7/2010 | |
| CN | 202975548 | U | 6/2013 | |
| CN | 103984174 | A | 8/2014 | |
| CN | 104898343 | A | 9/2015 | |
| CN | 112147825 | | * 12/2020 | ............. H01L 27/12 |
| CN | 215526310 | U | 1/2022 | |

* cited by examiner

*Primary Examiner* — Sang V Nguyen
(74) *Attorney, Agent, or Firm* — Maier & Maier, PLLC

(57) ABSTRACT

An array substrate, a display panel, and a display device. The array substrate includes: a plurality of data lines, a plurality of scanning lines, a pixel array, first common electrode lines, and second common electrode lines; the HSD design is applied to the array substrate, and the array substrate is provided with first common electrode lines and second common electrode lines, and the second common electrode lines are provided on the data lines and connected to each other to form a meshed structure of the common electrodes, which ensures the stability of the voltage signals of the common electrodes and effectively improves the display effect of the display panel.

15 Claims, 6 Drawing Sheets

ARRAY SUBSTRATE, DISPLAY PANEL AND DISPLAY DEVICE

CROSS REFERENCE TO RELATED APPLICATION

Pursuant to 35 U.S.C. § 119 and the Paris Convention Treaty, this application claims the benefit of Chinese Patent Application No. 202210246303.6 filed Mar. 14, 2022, the contents of which are incorporated herein by reference.

TECHNICAL FIELD

The present application relates to the technical field of array substrates, and more particularly to an array substrate, a display panel, and a display device.

BACKGROUND

The array substrate is composed of sub-pixel arrays. The common electrodes of the sub-pixels and the pixel electrodes form storage capacitors to ensure the normal display of the sub-pixels when the thin film transistor is turned off. Due to the fact that the voltage signals of the common electrodes on the array substrate and the voltage signals of the common electrodes on the color film substrate are the same, the irregular electric field at the edge of the pixel can be shielded, and the dark fringe due to disordered orientation of liquid crystal molecules can be avoided. Therefore, the stability of the voltage signals of the common electrodes on the array substrate is very important for the display effect of the array substrate and the display panel.

In order to improve the stability of the voltage signals of the common electrodes, the common practice is to form the voltage signals of the common electrodes of the entire panel into a mesh shape to ensure the stability of the voltage signals of the common electrodes of the entire array substrate. However, the general meshed design will seriously affect the aperture ratio of the pixels, and how to design the meshed common electrode with the smallest influence of the aperture ratio is a major difficulty.

In the Half Source Driving (HSD) pixel array, two adjacent pixel units in the horizontal direction share a data line. When comparing to the traditional pixel array, the data lines can be reduced by half, and the adjacent pixel units in a same row are connected to different scanning lines, pixels in the same row separated apart by one pixel unit from each other are connected to the same scanning line, so that the number of scanning lines is doubled compared to the traditional pixel array.

The traditional HSD design requires 2-line driving in order to realize the positive-negative-positive-negative (+−+−) inversion display in the vertical direction X, that is, the data signal on the same data line requires to be inverted the level when the row-on signals are input for every two lines of scanning lines, the inversion of the level leads to an increase in power consumption, and due to the different driving sequences of pixels on both sides of the same data line, the delay of the data signal will cause a difference in the charging of adjacent pixels, which results in display defects of vertical bright and dark lines.

In addition, in the traditional HSD design, the meshed common electrode structure is located between four adjacent pixel electrodes, and the common electrodes of adjacent rows are connected by a conductive structure. In order to avoid mutual influence between different signals and conductive structure, each of the four pixel electrodes is provided with a notch in the adjacent position, which seriously affects the aperture ratio of the pixels.

In order to solve the disadvantages of high power consumption of HSD and vertical bright and dark lines, the pixel electrodes are designed with long and short hands, that is, every two adjacent sub-pixels in a same row are connected to a same data line, and at the same time, the sub-pixels of different rows in a same column are cross-connected to two adjacent data lines, every two adjacent sub-pixels in a same row are respectively connected to two adjacent different scanning lines, and the sub-pixels of different rows of a same column are connected to different scanning lines.

By using the long and short hands design, the positive-negative-positive-negative (+−+−) inversion display in the vertical direction X can be realized by column inversion driving. However, due to the long and short hands design, the pixel electrodes of every two adjacent sub-pixels in a same row are far away from the data line need to be bridged by the conductive structure, which occupies the original position for setting the common electrode structure, so that the original common electrode structure design cannot be used normally, the voltage signals of the common electrode are disconnected from each other, and the meshed structure cannot be formed, which results in reduced stability.

SUMMARY

One of objects of the present application is to provide an array substrate, by adding another common electrode lines on the data lines and correspondingly connecting the common electrode lines to realize the meshed structure of the common electrodes, so as to solve the problem that the meshed common electrode structure cannot be designed in the traditional long and short hands design, resulting in the stability of the voltage signals of the common electrodes is reduced.

In a first aspect of the present application, an array substrate is provided, which includes: a plurality of data lines, a plurality of scanning lines, and a pixel array; the plurality of data lines are configured to input data signals of corresponding polarities; the plurality of scanning lines are configured to input row turn-on signals row by row; and the pixel array includes pixel units arranged in an array; the pixel units include: pixel electrodes and thin film transistors, the pixel electrodes being arranged in an array, and each of the pixel electrodes being respectively connected to the data lines and the scanning lines through the thin film transistors; a plurality of first common electrode lines, overlapping with edge portions of the pixel electrodes to form storage capacitors; and second common electrode lines, disposed on the data lines, and the second common electrode lines being correspondingly connected through conductive structures.

In an embodiment of the present application, the second common electrode lines and the first common electrode lines are connected to a voltage signal of a common electrode of a same magnitude.

In an embodiment of the present application, a pixel unit group is formed by two adjacent pixel units in a same row, and two adjacent pixel unit groups are respectively connected to two adjacent data lines, the two adjacent pixel units in a same row are connected to a same data line and are respectively connected to two adjacent different scanning lines, and two diagonal pixel units in two pixel unit groups in a same column are respectively connected to two adjacent different scanning lines, and two of the pixel units arranged in a same row and separated apart by one of the pixel units are connected to a same scanning line; and a wiring area for accommodating the corresponding thin film transistors and the scanning lines is provided between the pixel unit groups in adjacent rows, and two adjacent second common electrode lines are correspondingly connected through the conductive structures disposed in the wiring area.

In an embodiment of the present application, the first common electrode lines include first sub-common electrode lines and second sub-common electrode lines respectively overlapping with edge portions of the pixel electrodes;

each of the first sub-common electrode lines is located between two adjacent pixel electrodes in the pixel unit group;

each of the second sub-common electrode lines is located on a periphery of the pixel unit group;

in the pixel unit groups of adjacent rows, the first sub-common electrode lines are connected in a vertical direction, and the first sub-common electrode lines and the second sub-common electrode lines are located in different layers;

the wiring area is further provided with a plurality of first via holes, and the first sub-common electrode lines are connected to the conductive structures through the first via holes;

the second sub-common electrode lines corresponding to the pixel unit groups are connected to the conductive structure through the first via holes; and the second common electrode lines of adjacent columns are connected through the conductive structures.

In an embodiment of the present application, the first via holes are disposed at a position of the wiring area between the pixel unit groups of adjacent rows, and the first via holes are arranged adjacent to the data lines connected to a current pixel unit group.

In an embodiment of the present application, a periodic pixel unit group is composed of every two rows and every three columns of pixel units in a plurality of the pixel unit groups, and two first via holes are arranged corresponding to each periodic pixel unit group; and one of the two first via holes is arranged between a pixel unit group in a n-th column and a m-th row and a pixel unit group in the n-th column and a (m+1)-th row, and the other one of the first via holes is arranged between a pixel unit group in a (n+3)-th column and a (m+1)-th row and a pixel unit group in the (n+3)-th column and a (m+2)-th row, and n=3*(k−1)+1, k and m are positive integers.

In an embodiment of the present application, a wiring area for accommodating the corresponding thin film transistors and the scanning lines is provided between the pixel units in adjacent rows;

each of the pixel electrodes is provided with an unfilled corner, the unfilled corner is arranged adjacent to the data lines and the wiring area, and one second via hole is arranged corresponding to a position of each of the unfilled corners; and the first common electrode lines are connected to the conductive structures through the second via holes, and the second common electrode lines are connected to the second via holes through the conductive structures.

In an embodiment of the present application, every two of the second via holes are symmetrically arranged on both sides with one data line as a center.

In a second aspect of the present application, a display panel is provided, which includes a color film substrate, a liquid crystal layer and the array substrate above-mentioned, and the liquid crystal layer is located between the color film substrate and the array substrate.

In a third aspect of the present application, a display panel is provided, which includes a backlight module, a display panel driving circuit and the display panel above-mentioned, and the display panel driving circuit is correspondingly connected to the display panel, and the backlight module is arranged opposite to the display panel.

Compared with the prior art, the beneficial effects of the embodiments of the present application are: the HSD design is applied to the array substrate, and the array substrate is provided with first common electrode lines and second common electrode lines, and the second common electrode lines are provided on the data lines and connected to each other to form a meshed structure of the common electrodes, which ensures the stability of the voltage signals of the common electrodes and effectively improves the display effect of the display panel.

DETAILED DESCRIPTION

In order to make the technical problems, technical solutions and beneficial effects to be solved by the present application clearer, the present application will be described in further detail below with reference to the accompanying drawings and embodiments. It should be understood that the specific embodiments described herein are only used to explain the present application, but not to limit the present application.

In addition, the terms "first" and "second" are only used for descriptive purposes, and should not be construed as indicating or implying relative importance or implying the number of indicated technical features. Thus, a feature defined as "first" or "second" may expressly or implicitly includes one or more of that feature. In the description of the present application, "plurality" means two or more, unless otherwise expressly and specifically defined.

Embodiment 1

Figure 1:
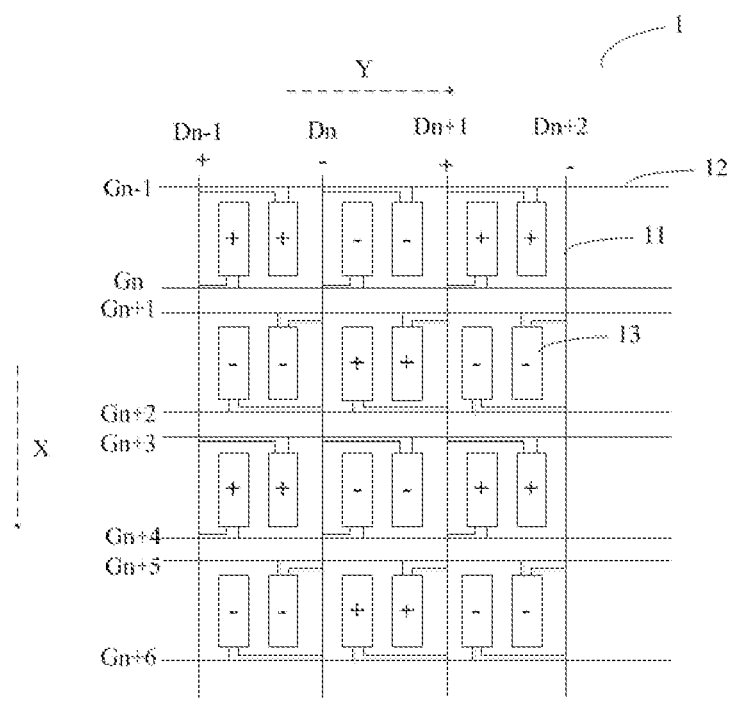
FIG. 1 is a schematic diagram of a junction arrangement of sub-pixels of an array substrate provided in an embodiment 1 of the present application.

The first aspect of the embodiment of the present application provides an array substrate 1. As shown in FIG. 1, in the embodiment, the array substrate 1 includes a plurality of data lines 11, a plurality of scanning lines 12, a pixel array; the plurality of data lines are arranged in sequence along the horizontal direction Y, and the plurality of scanning lines are arranged in sequence along the vertical direction X, and the polarities of the data signals received on the adjacent data lines 11 are reversed, and the plurality of scanning lines 12 are used for inputting row turn-on signals row by row.

The pixel array includes pixel unit groups arranged in an array, two adjacent pixel unit groups are respectively connected to two adjacent data lines 11, each pixel unit group includes two adjacent pixel units 13 in a same row, and two adjacent pixel units 13 in a same row are connected to a same data line 11 and are respectively connected to two adjacent different scanning lines 12. The two diagonal pixel units 13 of the two pixel unit groups of a same column are respectively connected to two adjacent different scanning lines 12; and two pixel units 13 in a same row separated apart by one pixel unit 13 are connected to a same scanning line 12.

Figure 2:
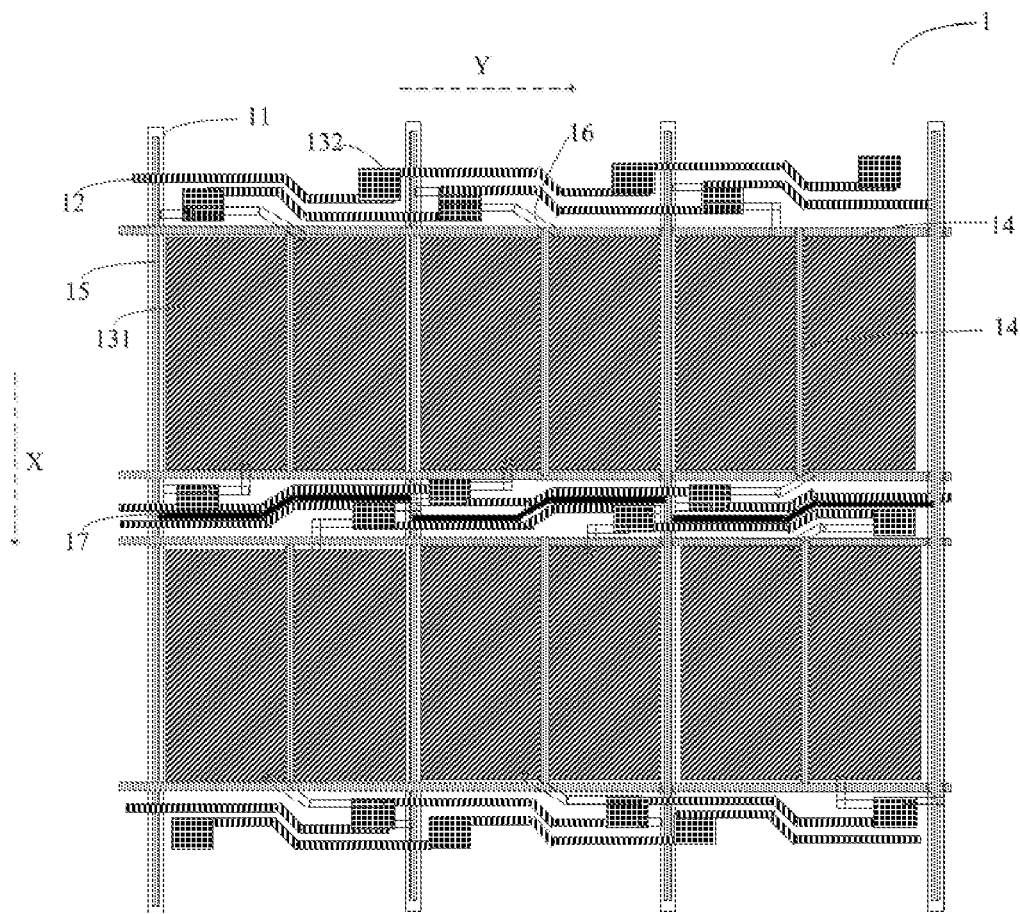
FIG. 2 is a schematic structural diagram of an array substrate provided in Embodiment 2 of the present application.

As shown in FIG. 2, the pixel unit 13 includes pixel electrodes 131 and thin film transistors 132, the pixel electrodes 131 are arranged in an array, and each pixel electrode 131 is respectively connected to the data line 11 and the scanning line 12 through the thin film transistor 132; each first common electrode line is located in two adjacent pixel electrodes 131 in the pixel unit group and partially overlaps with the two adjacent pixel electrodes 131 along the column direction to form storage capacitors;

The second common electrode lines 15 are disposed on each of the data lines 11, and the second common electrode lines are correspondingly connected through conductive structures.

In the embodiment, the pixel units 13 are connected with the data lines 11 and the scanning lines 12 using a long and short hands structure, and the polarities of the driving signals on the data lines 11 remain unchanged. As shown in FIG. 1, taking a n-th data line as example, when the scanning lines 12 input the row turn-on signal row by row, the pixel unit groups cross-connected with the data line 11 are all negative data signals. From the overall point of view, the data line 11 can realize the positive-negative-positive-negative polarity inversion in a column inversion manner, and during the line scanning driving process, the polarities are not to be changed. Therefore, the voltage in each frame is constant, and there is no polarity switching between the positive and the negative, which effectively improves the problems of vertical bright and dark lines, power consumption and signal interference in the vertical direction X.

At the same time, on the array substrate 1, the first common electrode lines 14 are disposed in the two pixel electrodes 131 in the pixel unit group, and the first common electrode lines 14 are partially overlapped with the two pixel electrodes 131 to form storage capacitors, so as to ensure that the picture of the sub-pixels are is displayed normally in the off state of the thin film transistor 132. At the same time, the first common electrode lines 14 and the second common electrode lines 15 are connected to the voltage signals of the common electrodes of a same magnitude. Since the voltage signals of the first common electrode of the array substrate 1 and the common electrode of the color film substrate 1 are the same, therefore, the irregular electric field at the edges of the pixels can be shielded, and the dark fringe due to disordered orientation of liquid crystal molecules can be avoided.

Due that the long and short hands design of the pixel array, as shown in FIG. 2, in the two pixel electrodes 131 in the same pixel unit group connected to the same data line 11, the upper and lower positions of the pixel electrodes 131 adjacent to the data line 11 are respectively provided with thin film transistors 132, and the thin film transistors 132 are respectively configured for connecting the two pixel electrodes 131 to the data line 11 and the adjacent scanning line 12, the pixel electrode 131 away from the data line 11 is connected to the thin film transistor 132 through the conductive film 16, and the conductive film 16 is bridged in the middle position of two pixel unit groups of two adjacent rows, the two first common electrode lines 14 in the two pixel unit groups of two adjacent rows have no connection position, therefore, the meshed common electrode structure cannot be realized.

In order to further realize the meshed common electrode structure and ensure the stability of the voltage signals of the common electrodes, in the embodiment, second common electrode lines 15 are stacked on each of the data lines 11, and the second common electrode lines 15 are directly or indirectly connected to each other through the conductive structures 17, such as, the second common electrode lines 15 are directly connected to each other through the corresponding wiring areas, or the second common electrode lines 15 are indirectly connected to each other through via holes on the array substrate 1, and the specific connection methods are not limited herein. By connecting the second common electrode lines 15 two by two such that the voltage signals of the common electrodes of the entire array substrate 1 form a meshed structure, therefore, the stability of the voltage signals of the common electrodes is ensured, and the display effect of the display panel 100 is effectively improved.

Furthermore, in order to shield the interference of the scanning lines 12 to the pixel electrodes 131, the voltage signals of the common electrodes of the second common electrode lines 15 and the voltage signals of the common electrodes on the first common electrode lines 14 are the same. Since the voltage signals of the second common electrode lines 15 newly added are the same as that of the first common electrode lines 14, therefore, the interference of the scanning lines 12 to the pixel electrodes 131 can be shielded in the horizontal direction Y, and the display effect of the display panel 100 is further improved.

The second common electrode lines 15 adopt the conductive structures 17, and the material type can be selected accordingly. In an embodiment of the present application, the second common electrode lines 15 and the conductive structures 17 are both semiconductor transparent conductive films 16 made of indium tin oxide.

Furthermore, the positions of the conductive structures 17 connected to the second common electrode lines 15 can be arranged correspondingly, and the specific structures are not limited.

Compared with the prior art, the beneficial effects of the embodiments of the present application are: the array substrate 1 adopts the HSD design, and the sub-pixels adopt the long and short hands design, so as to reduce power consumption and solve the problem of bright and dark lines. The first common electrode lines 14 and the second common electrode lines 15 are arranged on the array substrate 1, the second common electrode lines 15 are arranged on the data lines 11 and the second common electrode lines 15 are connected to each other to form a common electrode meshed structure, so that the stability of the voltage signals of the common electrodes can be ensured, and the voltage signals of the second common electrode lines 15 newly added are the same as that of the first common electrode lines 14, therefore, the interference of the scanning lines 12 to the pixel electrodes 131 can be shielded in the horizontal direction Y, and the display effect of the display panel 100 is further improved.

Embodiment 2

Based on the embodiment 1, as shown in FIG. 2, in an embodiment of the present application, a wiring area for accommodating the corresponding the thin film transistor 132 and the scanning lines 12 is provided between the pixel unit groups of two adjacent rows, and the two adjacent second common electrode lines 15 are connected by the conductive structures 17 disposed in the wiring area.

In the embodiment, the wiring area between pixel unit groups of two adjacent columns is provided with two scanning lines 12 and a plurality of thin film transistors 132 connected to two pixel electrodes 131 arranged diagonally. In order to avoid interference caused by the conductive structures 17 bridged on the pixel electrodes 131, and the conductive structures 17 between the second common electrode lines 15 is disposed in the wiring area to reduce signal interference. By directly connecting the second common electrode lines 15 two by two through the wiring area, the voltage signals of the common electrodes of the entire array substrate 1 form a meshed structure, which ensures the stability of the voltage signals of the common electrodes and effectively improves the display effect of the display panel 100.

The conductive structures 17 are stacked on the scanning lines 12, or the conductive structures 17 are wired separately from the scanning lines 12, and the specific arrangements are not limited herein.

Embodiment 3

Figure 3:
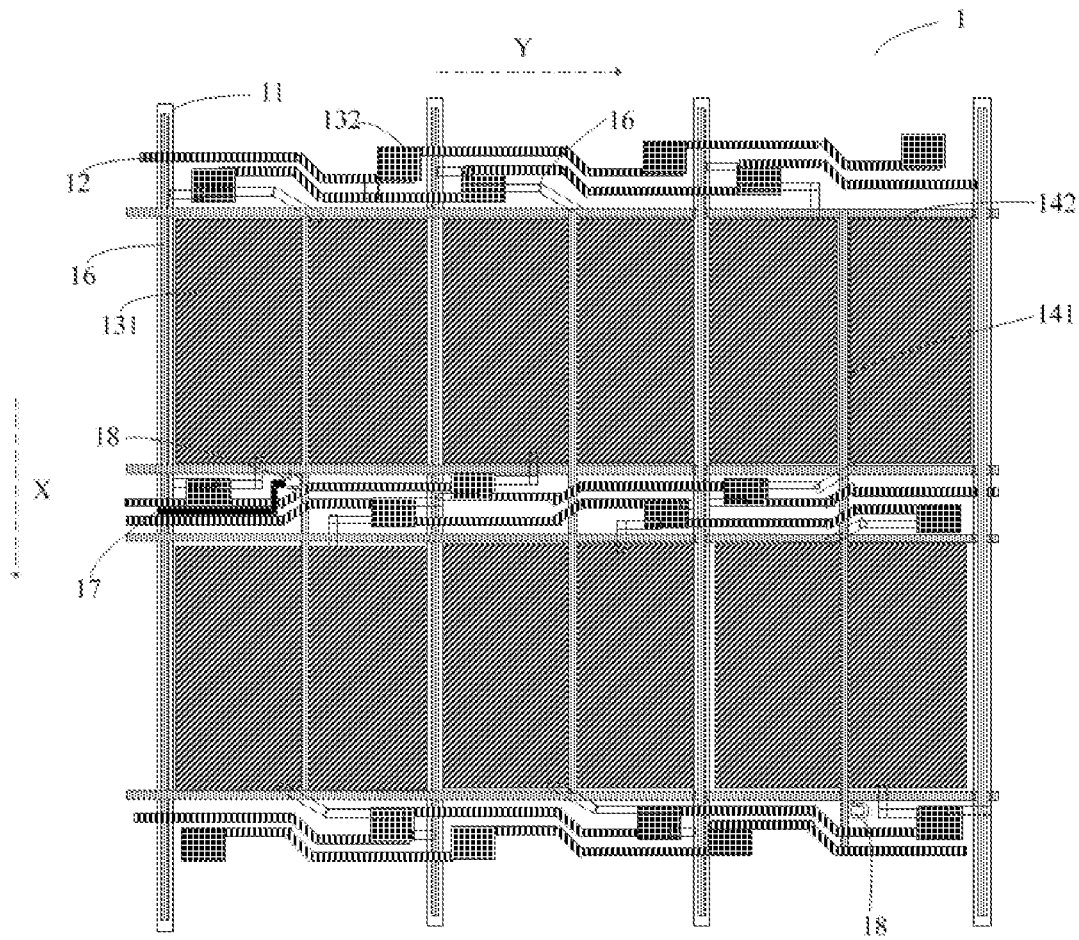
FIG. 3 is a schematic structural diagram of an array substrate provided in Embodiment 3 of the present application.
Figure 4:
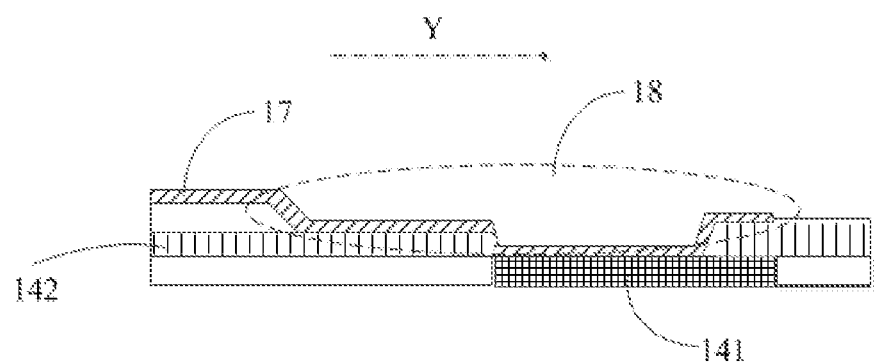
FIG. 4 is a schematic structural diagram of a first via hole in an array substrate provided in Embodiment 3 of the present application.

Based on the embodiment 1, as shown in FIG. 3 and FIG. 4, in an embodiment of the present application, the first common electrode lines 14 include first sub-common electrode lines 141 and the second sub-common electrode lines 142 that are overlapped with the edge portions of the pixel electrodes 131, respectively;

The first sub-common electrode lines 141 are located between two adjacent pixel electrodes 131 in the pixel unit groups;

The second sub-common electrode lines 142 are located at the peripheries of the pixel unit groups;

In the pixel unit groups of adjacent rows, the first sub-common electrode lines 141 are connected along the vertical direction X, and the first sub-common electrode lines 141 and the second sub-common electrode lines 142 are located in different layers;

The wiring area is further provided with a plurality of first via holes 18, and the first sub-common electrode lines 141 are connected to the conductive structures 17 through the first via holes 18;

The second sub-common electrode lines 142 corresponding to the pixel unit group are connected to the conductive structures 17 through the first via holes 18;

The second common electrodes lines 15 of adjacent columns are connected by the conductive structures 17.

In the embodiment, the first via holes 18 are disposed in the wiring area. As shown in FIG. 4, the conductive structures 17 are in electrical contact with the first sub-common electrode lines 141 and the second sub-common electrode lines 142 respectively through the first via holes 18. Therefore, the first common electrodes (that is, the first sub-common electrode lines 141) of the pixel electrode 131 in the vertical direction X are connected in series through the conductive structures 17 and the second common electrode lines 15, and the first common electrodes (that is, the second sub-common electrode lines 142) spaced apart by every two pixel electrodes 131 are connected through the conductive structures 17 and the second common electrode lines 15, and finally, the voltage signals of the common electrodes of the entire display panel 100 are periodically connected to ensure the stability of the voltage signals of the common electrodes, and to improve the display effect of the display panel 100.

Furthermore, compared with the embodiment 2, in the embodiment, the first common electrode lines 14 and the second common electrode lines 15 are periodically connected in series to ensure the stability of the voltage signals of the common electrodes and to improve the display effect of the display panel 100.

The positions of the first via holes 18 can be adjusted correspondingly. In order to simplify the process, in an embodiment of the present application, the first via holes 18 are arranged at the positions of the wiring area between the pixel unit groups of adjacent rows, and the first via holes 18 are arranged adjacent to the data lines 11 connected to current pixel unit groups. That is, the first via holes 18 are adjacent to the second common electrode lines 15 and are connected correspondingly through the first via holes 18 and the conductive structures 17.

Furthermore, the number of the first via holes 18 are arranged correspondingly, and the first via holes 18 are arranged at the middle position of every two rows of pixel unit groups, or the first via holes 18 are arranged at intervals, as shown in FIG. 3, in an embodiment of the present application, every two rows and three columns of the pixel unit groups compose a period pixel unit group, and two first via holes 18 are correspondingly provided in each period pixel unit group;

In the embodiment, one of the two first via holes 18 is arranged between the pixel unit group of the n-th column and the m-th row and the pixel unit group of the n-th column and the (m+1)-th row; and another one of the two first via holes 18 is arranged between the pixel unit group of the (n+3)-th column and the (m+1)-th row and the pixel unit group of the (n+3)-th column and the (m+2)-th row, in which, n=3*(k−1)+1, and k and m are positive integers.

In the embodiment, six pixel unit groups arranged in an array are used as a minimum unit, and two first via holes 18 are arranged in the wiring area at the diagonal position to ensure the stability of the voltage signals of the common electrodes of the entire display panel 100.

Embodiment 4

Figure 5:
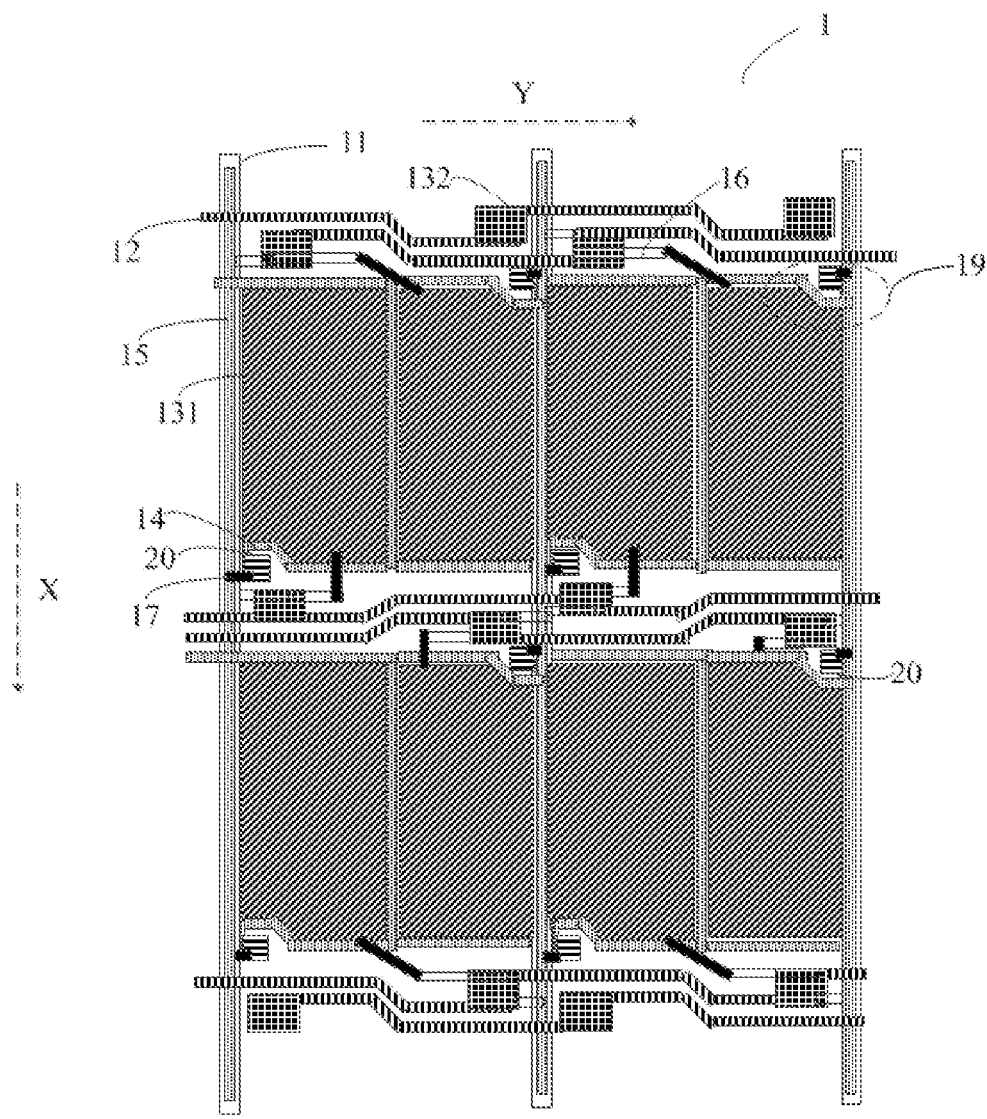
FIG. 5 is a schematic diagram of a first structure of an array substrate provided in Embodiment 4 of the present application.
Figure 6:
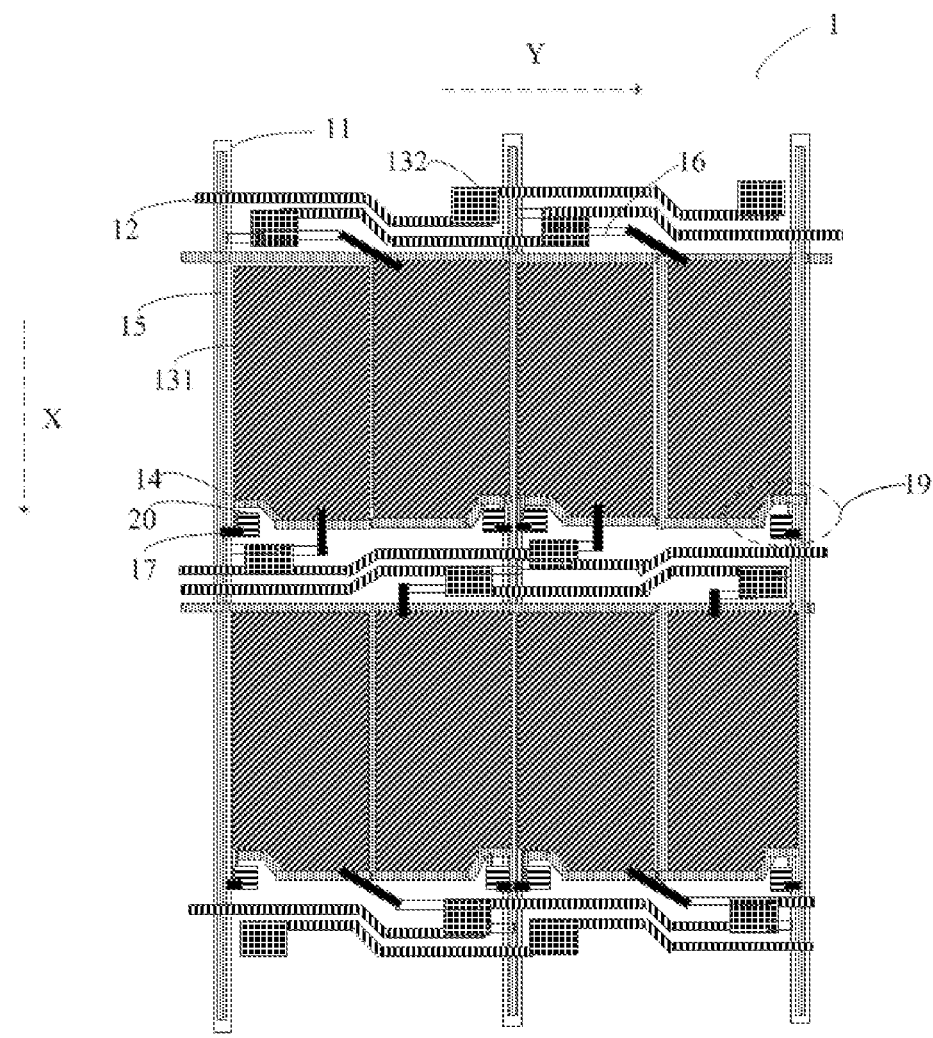
FIG. 6 is a schematic diagram of a second structure of an array substrate provided in Embodiment 4 of the present application.
Figure 7:
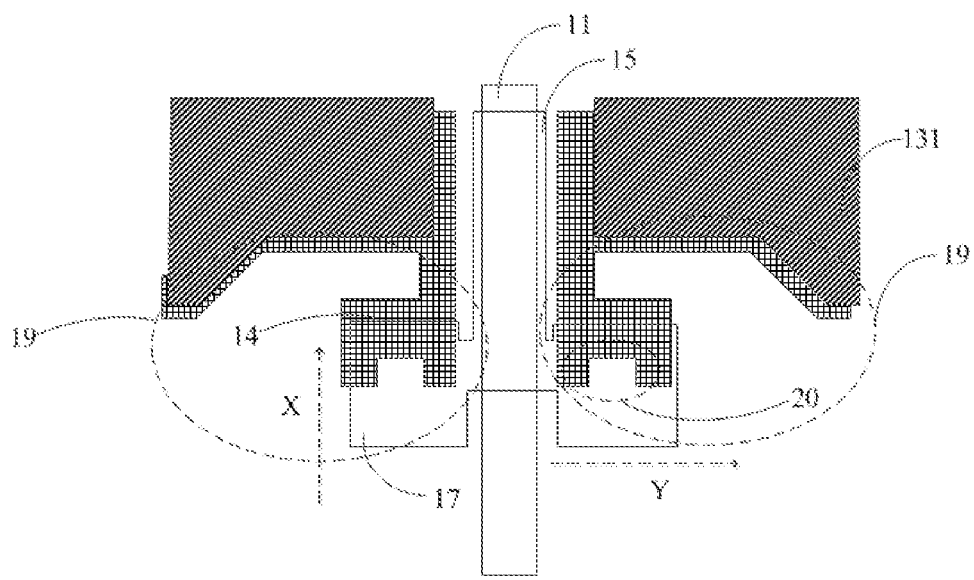
FIG. 7 is a partially enlarged schematic diagram of an unfilled corner in the array substrate provided in Embodiment 4 of the present application.

On the basis of the embodiment 1, as shown in FIG. 5 and FIG. 6, in an embodiment of the present application, a wiring area for accommodating the corresponding thin film transistors 132 and the scan lines 12 is provided between the pixel unit groups of adjacent rows;

Each pixel electrode 131 is provided with an unfilled corner 19, the unfilled corner 19 is arranged adjacent to the data lines 11 and the wiring area, and one second via hole 20 is arranged corresponding to each unfilled corner 19;

As shown in FIG. 7, which is a partial enlarged view of the unfilled corners 19, the first common electrode lines 14 are connected to the conductive structures 17 through the second via holes 20, and the second common electrode lines 15 are connected to the second via holes 20 through the conductive structures 17.

Figure 8:
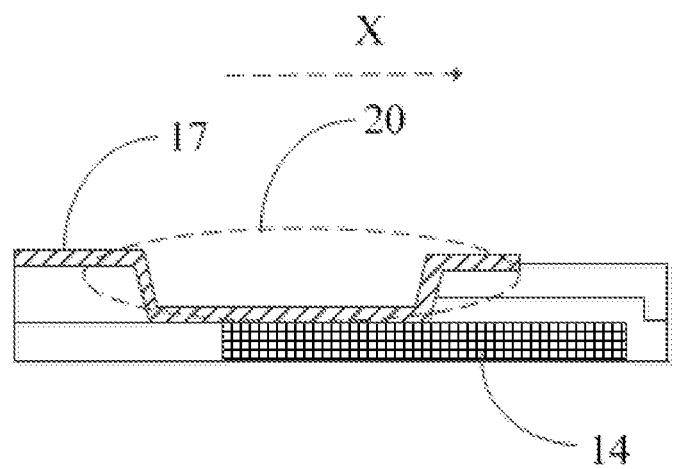
FIG. 8 is a schematic structural diagram of a second via hole in a vertical direction of an array substrate provided in Embodiment 4 of the present application.
Figure 9:
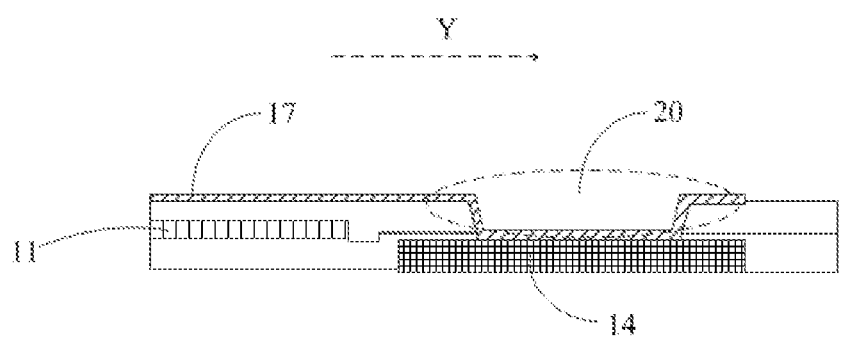
FIG. 9 is a schematic structural diagram of a second via hole in a horizontal direction of an array substrate provided in Embodiment 4 of the present application.

In the embodiment, the same via connection method is adopted as in the embodiment 3, but the number and positions of via holes are changed. Two second via holes 20 are provided on both sides of the data line 11 and the second common electrode line 15, and two second via holes 20 are respectively used for connecting the first common electrode lines 14 on the left and right sides of the data line 11 and the second common electrode lines 15 stacked on the data line 11 through the conductive structures 17, as shown in FIG. 7 and FIG. 8, in the vertical direction X, the first common electrode lines 14 are electrically connected to the conductive structures 17 through the second via holes 20, and as shown in FIG. 7 and FIG. 9, in the horizontal direction Y, the second common electrode lines 15 stacked on the data line 11 are connected to the conductive structures 17, and the conductive structures 17 are electrically connected to the first common electrode lines 17 through the second via holes 20, therefore, the first common electrode lines 14 of each pixel electrode 131 are connected in series in the vertical direction X through the second common electrode lines 15 in the vertical direction X, and the first common electrode lines 14 of each pixel electrode 131 are connected in series in the horizontal direction Y through the conductive structures 17 arranged laterally in the middle of the pixel electrode 131 and the second common electrode lines 15, the combination of the two directions finally achieves that the common electrodes of the entire display panel 100 are connected in series, to ensure good stability of the voltage signals of the common electrodes and improve the display quality of the panel.

Furthermore, the second via holes 20 are arranged at the notch formed by the local digging hole in the wiring area, and the two adjacent pixel electrodes 131 in the vertical direction X are not connected with the two via holes bridged by the conductive structures 17, therefore, it is not limited by the long and short hands of the sub-pixels, and only one second via hole 20 is needed beside each sub-pixel electrode 131, which only affects one corner of the pixel electrode 131. Therefore, compared with the conventional meshed common electrode via design, in the embodiment, while achieving the purpose of connecting the first common electrode 14 and the second common electrode 15 of each sub-pixel electrode 131 in series, the aperture ratio can be optimized.

In the embodiment, the two second via holes 20 located on both sides of the data line 11 and the second common electrode line 15 are arranged diagonally in FIG. 5 or symmetrically arranged with the data line 11 as the center as shown in FIG. 6. In an embodiment of the present application, in order to simplify the process, as shown in FIG. 6 and FIG. 7, every two second via holes 20 are symmetrically arranged with the data line 11 as the center.

Embodiment 5

Figure 10:
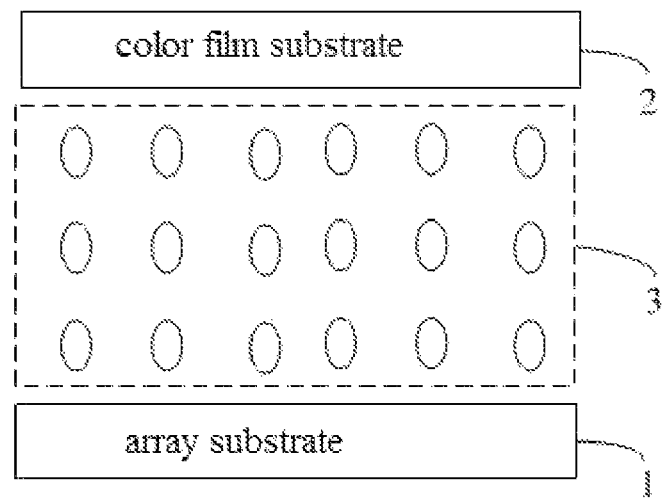
FIG. 10 is a schematic structural diagram of a display panel provided in Embodiment 5 of the present invention.

The present application further provides a display panel 100. As shown in FIG. 10, the display panel 100 includes a color film substrate 2, a liquid crystal layer 3, and an array substrate 1. The specific structure of the array substrate 1 refers to the above-mentioned embodiments. Since the display panel 100 adopts all the technical solutions of the above-mentioned embodiments, the display panel 100 of the embodiment 5 has at least all the beneficial effects brought about by the technical solutions of the above-mentioned embodiments, which will not be repeated here.

In the embodiment, the color film substrate 2 includes an upper polarizer, a color filter, a common electrode layer, and an upper alignment layer, and the array substrate 1 includes a lower alignment layer, a driving layer, and a lower polarizer, in which the driving layer is a driving layer of the thin film transistor 132, and the driving layer is used to cooperate with the common electrode layer to drive the liquid crystal molecules of the liquid crystal layer 3. The array substrate 1 is provided with corresponding data lines 11, the scanning lines 12, a pixel array, the first common electrode lines 14 and the second common electrode lines 15.

Embodiment 6

Figure 11:
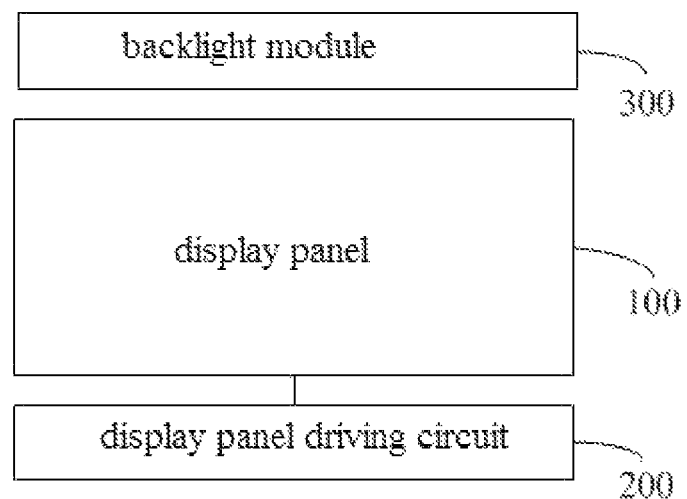
FIG. 11 is a schematic structural diagram of a display device provided in Embodiment 6 of the present application.

The present application further proposes a display device. As shown in FIG. 11, the display device includes a backlight module 300, a display panel driving circuit 200, and a display panel 100. The specific structure of the display device refers to the above-mentioned embodiment. The display device has all the technical solutions of the above-mentioned embodiments, and therefore at least has all the beneficial effects brought about by the technical solutions of the above-mentioned embodiments, and which will not be repeated here. The display panel driving circuit 200 is correspondingly connected to the display panel 100, and the backlight module 300 is disposed opposite to the display panel 100.

In the embodiment, the display panel driving circuit 200 includes a source driving circuit, a gate driving circuit, a voltage compensation circuit 400, and a common electrode voltage circuit 300, and further includes a timing controller and a power management integrated circuit; the timing controller controls the source driving circuit and the gate driving circuit to scanning row by row. Furthermore, the common electrode voltage circuit 300 obtains an analog voltage output by the power management integrated circuit, and converts the analog voltage into voltage signals of the common electrodes of corresponding magnitude, and outputs the voltage signal through the array substrate 1 and other structures to the common electrode layer of the color film substrate 2, and output to the first common electrode lines 14 and the second common electrode lines 15 on the array substrate 1, the voltage signals of the common electrodes on the common electrode layer of the color film substrate 2 is cooperated with the data driving signal output by source driving circuit to drive the liquid crystal molecules, and cooperates with the backlight module 300 to display corresponding image information.

The above-mentioned embodiments are only used to illustrate the technical solutions of the present application, but not to limit them. Although the present application has been explained in detail with reference to the above-described embodiments, it should be understood for the ordinary skilled one in the art that, the technical solutions described in each of the above-described embodiments can still be amended, or some technical features in the technical solutions can be replaced equivalently; these amendments or equivalent replacements won't make the essence of corresponding technical solution to be broken away from the spirit and the scope of the technical solution in various embodiments of the present application.

What is claimed is:

1. An array substrate, comprising:
a plurality of data lines configured to input data signals of corresponding polarities;
a plurality of scanning lines configured to input row turn-on signals row by row; and
a pixel array comprising pixel units arranged in an array;
wherein the pixel units comprise:
pixel electrodes and thin film transistors, the pixel electrodes arranged in an array, and each of the pixel electrodes respectively connected to the data lines and the scanning lines through the thin film transistors;
a plurality of first common electrode lines overlapping with edge portions of the pixel electrodes to form storage capacitors; and
second common electrode lines disposed on the data lines, and the second common electrode lines correspondingly connected through conductive structures;
wherein a pixel unit group is formed by two adjacent pixel units in a same row, two adjacent pixel unit groups are respectively connected to two adjacent data lines, the two adjacent pixel units in a same row are connected to a same data line and are respectively connected to two adjacent different scanning lines, two diagonal pixel units in two pixel unit groups in a same column are respectively connected to two adjacent different scanning lines, and two of the pixel units arranged in a same row and separated apart by one of the pixel units are connected to a same scanning line;
wherein the first common electrode lines comprise first sub-common electrode lines and second sub-common electrode lines respectively overlapping with edge portions of the pixel electrodes;
each of the first sub-common electrode lines is located between two adjacent pixel electrodes in the pixel unit group;
each of the second sub-common electrode lines is located on a periphery of the pixel unit group;
in the pixel unit groups of adjacent rows, the first sub-common electrode lines are connected in a vertical direction, and the first sub-common electrode lines and the second sub-common electrode lines are located in different layers;
the wiring area is further provided with a plurality of first via holes, and the first sub-common electrode lines are respectively connected to the conductive structures through the first via holes;
the second sub-common electrode lines corresponding to the pixel unit groups are connected to the conductive structures through the first via holes;
the second common electrode lines of adjacent columns are connected through the conductive structures; and
wherein a periodic pixel unit group is composed of every two rows and every three columns of pixel units in a plurality of the pixel unit groups, and two first via holes are arranged corresponding to each periodic pixel unit group;
wherein one of the two first via holes is arranged between a pixel unit group in a n-th column and a m-th row and a pixel unit group in the n-th column and a (m+1)-th row, and the other one of the two first via holes is arranged between a pixel unit group in a (n+3-th column and a (m+1)-th row and the pixel unit group in the (n+3)-th column and a (m+2)-th row, and wherein n=3*(k−1)+1, k and m are positive integers.

2. The array substrate according to claim 1, wherein the second common electrode lines and the first common electrode lines are connected to a voltage signal of a common electrode of a same magnitude.

3. The array substrate according to claim 1, wherein
a wiring area for accommodating the corresponding thin film transistors and the scanning lines is provided between the pixel unit groups in adjacent rows, and two adjacent second common electrode lines are correspondingly connected through the conductive structures disposed in the wiring area.

4. The array substrate according to claim 1, wherein the first via holes are disposed at a position of the wiring area between the pixel unit groups of adjacent rows, and the first via holes are arranged adjacent to the data lines connected to a current pixel unit group.

5. The array substrate according to claim 1, wherein a wiring area for accommodating the corresponding thin film transistors and the scanning lines is provided between the pixel units in adjacent rows;
each of the pixel electrodes is provided with an unfilled corner, the unfilled corner is arranged adjacent to the data lines and the wiring area, and one second via hole is arranged corresponding to a position of each of the unfilled corners; and
the first common electrode lines are connected to the conductive structures through the second via holes, and the second common electrode lines are connected to the second via holes through the conductive structures.

6. The array substrate according to claim 5, wherein every two of the second via holes are symmetrically arranged on both sides with one data line as a center.

7. A display panel, comprising a color film substrate, a liquid crystal layer and an array substrate, the array substrate comprising:
a plurality of data lines configured to input data signals of corresponding polarities;
a plurality of scanning lines configured to input row turn-on signals row by row; and
a pixel array comprising pixel units arranged in an array;
wherein the pixel units comprise:
pixel electrodes and thin film transistors, the pixel electrodes arranged in an array, and each of the pixel electrodes respectively connected to the data lines and the scanning lines through the thin film transistors;
a plurality of first common electrode lines overlapping with edge portions of the pixel electrodes to form storage capacitors; and
second common electrode lines disposed on the data lines, and the second common electrode lines correspondingly connected through conductive structures;
wherein a pixel unit group is formed by two adjacent pixel units in a same row, two adjacent pixel unit groups are respectively connected to two adjacent data lines, the two adjacent pixel units in a same row are connected to a same data line and are respectively connected to two adjacent different scanning lines, two diagonal pixel units in two pixel unit groups in a same column are respectively connected to two adjacent different scanning lines, and two of the pixel units arranged in a same row and separated apart by one of the pixel units are connected to a same scanning line;
wherein the first common electrode lines comprise first sub-common electrode lines and second sub-common electrode lines respectively overlapping with edge portions of the pixel electrodes;

each of the first sub-common electrode lines is located between two adjacent pixel electrodes in the pixel unit group;

each of the second sub-common electrode lines is located on a periphery of the pixel unit group;

in the pixel unit groups of adjacent rows, the first sub-common electrode lines are connected in a vertical direction, and the first sub-common electrode lines and the second sub-common electrode lines are located in different layers;

the wiring area is further provided with a plurality of first via holes, and the first sub-common electrode lines are respectively connected to the conductive structures through the first via holes;

the second sub-common electrode lines corresponding to the pixel unit groups are connected to the conductive structures through the first via holes;

the second common electrode lines of adjacent columns are connected through the conductive structures; and wherein a periodic pixel unit group is composed of every two rows and every three columns of pixel units in a plurality of the pixel unit groups, and two first via holes are arranged corresponding to each periodic pixel unit group;

wherein one of the two first via holes is arranged between a pixel unit group in a n-th column and a m-th row and a pixel unit group in the n-th column and a (m+1)-th row, and the other one of the two first via holes is arranged between a pixel unit group in a (n+3-th column and a (m+1)-th row and the pixel unit group in the (n+3)-th column and a (m+2)-th row, and wherein n=3*(k−1)+1, k and m are positive integers; and wherein the liquid crystal layer is located between the color film substrate and the array substrate.

8. The display panel according to claim 7, wherein the second common electrode lines and the first common electrode lines are connected to a voltage signal of a common electrode of a same magnitude.

9. The display panel according to claim 7, wherein
a wiring area for accommodating the corresponding thin film transistors and the scanning lines is provided between the pixel unit groups in adjacent rows, and two adjacent second common electrode lines are correspondingly connected through the conductive structures disposed in the wiring area.

10. The display panel according to claim 7, wherein the first via holes are disposed at a position of the wiring area between the pixel unit groups of adjacent rows, and the first via holes are arranged adjacent to the data lines connected to a current pixel unit group.

11. The display panel according to claim 7, wherein a wiring area for accommodating the corresponding thin film transistors and the scanning lines is provided between the pixel units in adjacent rows;

each of the pixel electrodes is provided with an unfilled corner, the unfilled corner is arranged adjacent to the data lines and the wiring area, and one second via hole is arranged corresponding to a position of each of the unfilled corners; and the first common electrode lines are connected to the conductive structures through the second via holes, and the second common electrode lines are connected to the second via holes through the conductive structures.

12. The display panel according to claim 11, wherein every two of the second via holes are symmetrically arranged on both sides with one data line as a center.

13. A display device, comprising a backlight module, a display panel driving circuit and a display panel comprising a color film substrate, a liquid crystal layer and an array substrate, the array substrate comprising:

a plurality of data lines configured to input data signals of corresponding polarities;

a plurality of scanning lines configured to input row turn-on signals row by row; and a pixel array comprising pixel units arranged in an array;

wherein the pixel units comprise:

pixel electrodes and thin film transistors, the pixel electrodes arranged in an array, and each of the pixel electrodes respectively connected to the data lines and the scanning lines through the thin film transistors;

a plurality of first common electrode lines overlapping with edge portions of the pixel electrodes to form storage capacitors; and second common electrode lines disposed on the data lines, and the second common electrode lines correspondingly connected through conductive structures;

wherein a pixel unit group is formed by two adjacent pixel units in a same row, two adjacent pixel unit groups are respectively connected to two adjacent data lines, the two adjacent pixel units in a same row are connected to a same data line and are respectively connected to two adjacent different scanning lines, two diagonal pixel units in two pixel unit groups in a same column are respectively connected to two adjacent different scanning lines, and two of the pixel units arranged in a same row and separated apart by one of the pixel units are connected to a same scanning line;

wherein the first common electrode lines comprise first sub-common electrode lines and second sub-common electrode lines respectively overlapping with edge portions of the pixel electrodes;

each of the first sub-common electrode lines is located between two adjacent pixel electrodes in the pixel unit group;

each of the second sub-common electrode lines is located on a periphery of the pixel unit group;

in the pixel unit groups of adjacent rows, the first sub-common electrode lines are connected in a vertical direction, and the first sub-common electrode lines and the second sub-common electrode lines are located in different layers;

the wiring area is further provided with a plurality of first via holes, and the first sub-common electrode lines are respectively connected to the conductive structures through the first via holes;

the second sub-common electrode lines corresponding to the pixel unit groups are connected to the conductive structures through the first via holes;

the second common electrode lines of adjacent columns are connected through the conductive structures; and wherein a periodic pixel unit group is composed of every two rows and every three columns of pixel units in a plurality of the pixel unit groups, and two first via holes are arranged corresponding to each periodic pixel unit group;

wherein one of the two first via holes is arranged between a pixel unit group in a n-th column and a m-th row and a pixel unit group in the n-th column and a (m+1)-th row, and the other one of the two first via holes is arranged between a pixel unit group in a (n+3-th column and a (m+1)-th row and the pixel unit group in the (n+3)-th column and a (m+2)-th row, and wherein n=3*(k−1)+1, k and m are positive integers; and wherein the liquid crystal layer is located between the color film substrate and the array substrate; and wherein the display panel driving circuit is correspondingly connected to the display panel, and the backlight module is arranged opposite to the display panel.

14. The display device according to claim 13, wherein the second common electrode lines and the first common electrode lines are connected to a voltage signal of a common electrode of a same magnitude.

15. The display device according to claim 13, wherein
a wiring area for accommodating the corresponding thin film transistors and the scanning lines is provided between the pixel unit groups in adjacent rows, and two adjacent second common electrode lines are correspondingly connected through the conductive structures disposed in the wiring area.

* * * * *